Sept. 3, 1940.  F. B. HINCKLEY, JR  2,213,314
COTTON CLEANER AND FEEDER
Filed May 19, 1938

Frank B. Hinckley, Jr.
INVENTOR.
BY
ATTORNEY.

UNITED STATES PATENT OFFICE 2,213,314

COTTON CLEANER AND FEEDER

Frank B. Hinckley, Jr., Dallas, Tex.

Application May 19, 1938, Serial No. 208,849

1 Claim. (Cl. 19—37)

This invention relates to cotton cleaning equipment of the type employed in connection with ginning plants for removing burs, and other extraneous matter, preparatory to introduction into the gins, and its principal object resides in the provision of a combination of elements receiving the cotton from the source and acting thereupon through a series of bladed or toothed drums arranged above foraminous concaves to remove the burs, and other matter, from the cotton fibers and then in feeding the precleaned cotton to other cleaning equipment or into the gins.

Another object of the invention resides in the provision of cleaning equipment embodying a novel arrangement of drums whereby the cotton is first received by a beater drum and delivered to a carding drum whose teeth engage the fibers while a doffing drum cooperatively dislodges the burs therefrom, the cotton being stripped from the carding drum by a stripper drum.

Still another object of the invention is manifest in the provision of a bur extractor and cleaner capable of evenly feeding the cotton to subsequent cleaning machines or to the gins after removing the burs and the bulk of the leaves and trash therefrom and disposing of the latter.

Broadly, the invention seeks to comprehend the provision of equipment possessing unique advantages whereby much of the conventional apparatus may be dispensed with yet fulfilling the most exacting requirements for bur extracting and precleaning machinery.

While the foregoing objects are paramount, other and lesser objects will become manifest as the description proceeds taken in connection with the appended drawing wherein.

Figures 1, 2:
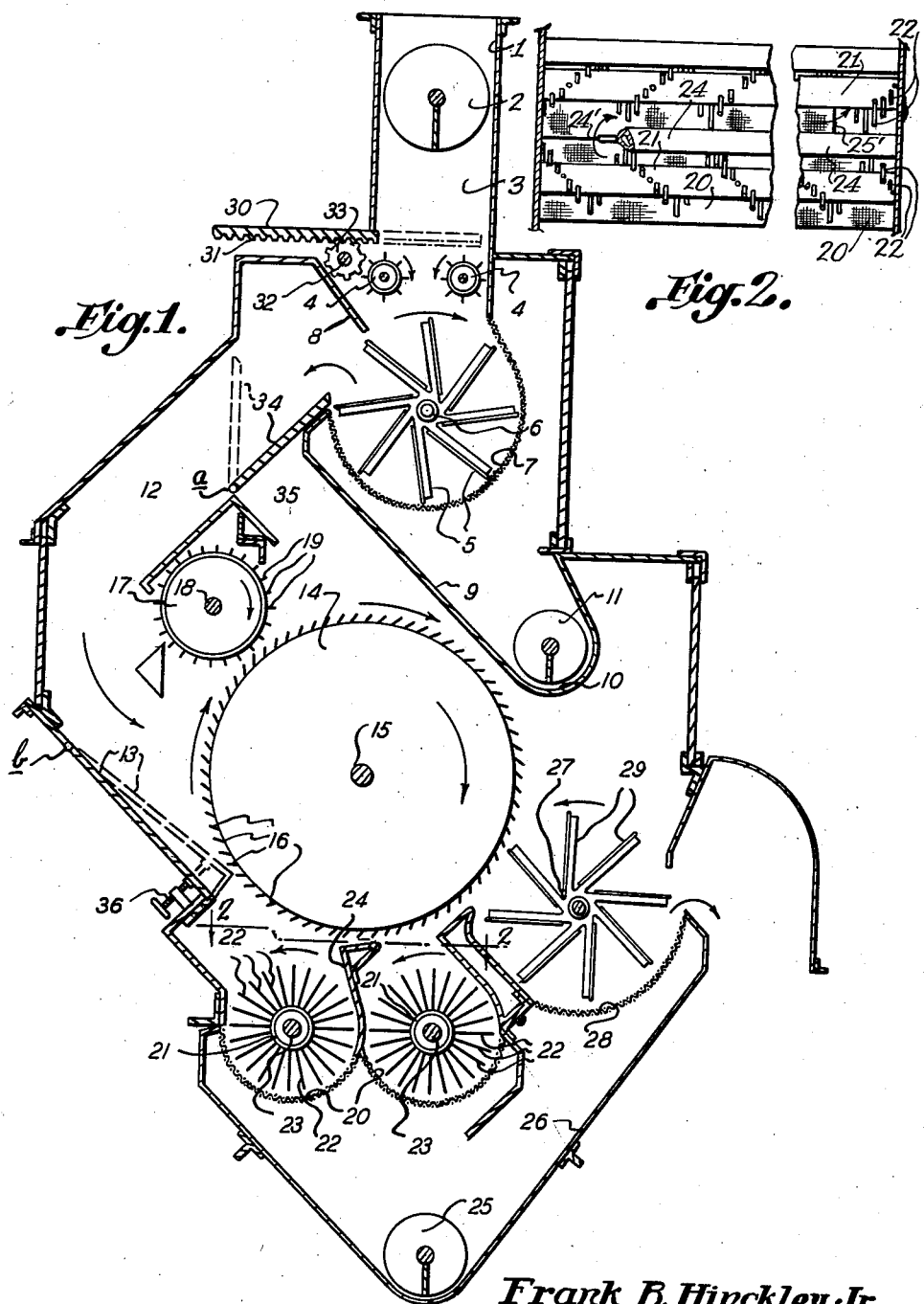
Figure 1 is a diagrammatical illustration of the invention showing the arrangement of the various drums and indicating by arrows the course of the cotton through the device.
Figure 2 is a view on line 2—2 on Figure 1.

The invention is suitably housed and arranged in such proximity to other equipment in the ginning plant deemed most effective and convenient. It is not considered necessary to elaborate upon any particular type of housing nor any special position or location of the device with respect to the other conventional equipment except to state that it is desirable to dispose the invention so that cotton delivered to the gin from a wagon or storage through the usual delivery system may first enter and pass through the invention receiving the initial cleaning operation.

It is therefore expedient to arrange the invention in cooperative relationship with the incoming suction delivery so that the cotton may be deposited into the receiving hopper 1 through which it is evenly distributed longitudinally of the invention by a flight conveyor 2.

The cotton is fed through the throat 3 of the hopper 1 between feed rolls 4 where it is engaged by the blades 5 of a beater drum 6. The blades 5 preferably extend tangentially of the axis of the drum 6, as illustrated. The drum 6 operates above a foraminous concave 7 over which the commodity is passed, as it is acted upon by the blades 5 of the drum 6, disposing of a quantity of any trash or dirt which might adhere to the fibers. A baffle 8 aids in directing the cotton against the drum 6. The dirt and trash sifted through the concave 7 will slide down a baffle 9 into a trough 10 to be carried away by another flight conveyor 11.

The cotton, to which burs, leaves and parts of stalks adhere, is urged or kicked out of the concave 7 into an inclined chute 12 to an inversely inclined baffle 13 which directs the cotton against a saw or carding drum 14, mounted upon a shaft 15, and which may be provided with a series of conventional rotary saw blades or toothed rings or its peripheral surface may be covered with a material known to the industry as carding cloth.

As the cotton is directed against the drum 14 the fibers adhere to the teeth 16. The material is thus carried over the drum 14 while a kicker roller 17, closely associated with the drum 14 and mounted upon a shaft 18, dislodges the clinging burs, and other extraneous substances, through the medium of the longitudinally attached blades 19 on this member. The dislodged burs and trash, together with the adhering fibers, are deposited by gravity into the first of a pair of foraminous concaves 20 which extend the full length of the machine beneath the carding drum 14. Beaters 21, having a series of spikes or fingers 22, are rotatably mounted in the concaves 20, as illustrated.

The fingers 22 are arranged spirally on the shafts 23 of the beaters 21, providing flight conveyors as well as agitators, which propel the material along the concaves 20, all the while throwing the mass upwardly against the drum 14 so that any clinging fibers may adhere to the drum 14 and be carried there around allowing the kicker 17 to dislodge the attached burs and trash.

The beaters 21 rotate in the same direction, as will be noted by reference to the illustration in Figure 2. At one end of the concaves 20 a suitable opening 24' is provided in the separating wall 24 between the concaves 20 to permit the material to pass from one concave to the other and be passed back along the latter concave to the opposite end where an opening 25' is provided to allow the mass to fall by gravity into the flight conveyor 25 and be carried away. A baffle 26 aids in deflecting the dirt and trash sifted through the concaves 20 into the conveyor 25.

The cotton adhering to the drum 14 is detached therefrom by a bladed drum 27 operating above a foraminous concave 28 at one side of the drum 14 and preferably below the horizontal axis thereof. This drum is similar to the beater drum 6, having tangentially arranged blades 29, which agitate the air and create a cyclonic disturbance at their outer edges near the surface of the drum 14 dislodging the fibers from the teeth 15 of the drum 14 and subjecting the commodity to substantial agitation over the foraminous concave 28 sifting the remaining liberated trash and dirt therethrough for a final cleaning and thence to other cleaning equipment or to the gins (not shown).

The drum 27 rotates anticlockwise, or opposite to the rotation of the drum 14, and at a much higher rate of speed than that of the latter. The results obtained by this member are considered superior to the conventional brush or air blast for the reason that an additional cleaning operation is simultaneously accomplished. Any dirt or trash liberated from the cotton by the drum 27 and passed through the concave 28 is deposited into the flight conveyor 25 and carried away with the other refuse.

It is sometimes desirable to separate different lots of cotton being processed through the invention and provision is made therefor. As the last of a certain lot passes through the throat 3 of the device a sliding closure 30 having a rack 31 secured thereto is operated across the opening in the throat 3, as shown in dotted lines, in the illustration, through the medium of a rotatable shaft 32 carrying a pinion 33 which meshes with the rack 31. The shaft 32 may be rotated by a crank or hand wheel (not shown).

The absence of a superfluity of burs or trash in the cotton may obviate the necessity of processing the material through the entire machine and it is desirable to thus provide a means for by-passing the product directly to the drum 14. This is accomplished by shifting a baffle board 34, which is hinged at $a$, so as to close the chute 12, as shown in dotted lines in the illustration, allowing the cotton to pass through the chute 35 to the top of the drum 14. The drum 27 acts upon the cotton in the same manner as if the commodity had passed through the entire assembly.

As the material is introduced into the chute 12, through which it falls by gravity toward the drum 14, it may be directed against the latter by adjusting the baffle 13 toward the drum 14 in the manner illustrated in dotted lines in the drawing. The baffle 13 is hinged at $b$ and is fixedly adjustable through the medium of a hand screw 36 thus affording the means whereby the passage of any of the material past the drum may be reasonably restricted and insuring the proper action of the drum 14 upon the commodity.

Obviously, the invention may be of a length considered best suited to the individual requirements and be housed in a manner deemed most expedient and adaptable to the particular circumstances.

Although the invention has been described with great particularity, it is obvious that certain changes and modifications may be resorted to from time to time by those skilled in the art and such changes and modifications which may be considered within the spirit and intent of the invention may also be considered as falling within the scope of the appended claim.

What is claimed is:

In combination with a bur extractor and cleaner for cotton, an initial receiving and beater drum, a toothed carding drum adherently receiving the said cotton and clinging extraneous matter, a kicker roll for detaching the extraneous matter from the adhering fibers of said cotton, doffing means rotatably operated along the peripheral surface of said carding drum detaching the cotton therefrom, said doffing means comprising a shaft having radially extending blades, tangential with respect to said shaft, effective in creating a cyclonic action on the air adjacent said carding drum, beaters having spaced, relatively right and left hand spirally arranged fingers rotatably disposed over foraminous concaves parallel with and beneath said carding drum for moving the detached extraneous matter against said carding drum in two directions, means for releasing residue from said concaves and means for discharging said residue from the machine.

FRANK B. HINCKLEY, Jr.